(12) United States Patent
Havar et al.

(10) Patent No.: US 8,596,585 B2
(45) Date of Patent: Dec. 3, 2013

(54) SLATS WITH A FLEXIBLE TRAILING EDGE

(75) Inventors: Tamas Havar, Bruckmuehl (DE); Oliver Meyer, Ottobrunn (DE); York C. Roth, Stade/Haddorf (DE); Oliver Seack, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 128 days.

(21) Appl. No.: 13/178,533

(22) Filed: Jul. 8, 2011

(65) Prior Publication Data
US 2012/0061523 A1 Mar. 15, 2012

Related U.S. Application Data

(60) Provisional application No. 61/362,907, filed on Jul. 9, 2010.

(30) Foreign Application Priority Data

Jul. 9, 2010 (DE) .................. 10 2010 026 619

(51) Int. Cl.
B64C 3/50 (2006.01)
(52) U.S. Cl.
USPC .......................................... 244/214; 244/204
(58) Field of Classification Search
USPC .................................................. 244/214, 204
See application file for complete search history.

(56) References Cited

U.S. PATENT DOCUMENTS

| | | | | |
|---|---|---|---|---|
| 2,306,759 A | * | 12/1942 | Sears | 244/210 |
| 3,128,966 A | * | 4/1964 | Alvarez-Calderon | 244/210 |
| 4,418,610 A | * | 12/1983 | Holtrop | 91/368 |
| 5,056,741 A | * | 10/1991 | Bliesner et al. | 244/214 |
| 6,220,549 B1 | * | 4/2001 | Tsunoda et al. | 244/205 |
| 6,247,670 B1 | * | 6/2001 | Eliahou-Niv et al. | 244/204 |
| 6,328,265 B1 | * | 12/2001 | Dizdarevic | 244/213 |
| 6,394,396 B2 | * | 5/2002 | Gleine et al. | 244/198 |
| 6,454,219 B1 | * | 9/2002 | Moe | 244/214 |
| 6,457,680 B1 | * | 10/2002 | Dobrzynski et al. | 244/210 |
| 6,536,714 B2 | * | 3/2003 | Gleine et al. | 244/214 |
| 7,766,281 B2 | * | 8/2010 | Lorkowski et al. | 244/215 |
| 8,006,941 B2 | * | 8/2011 | Lorkowski et al. | 244/215 |
| 8,276,852 B2 | * | 10/2012 | Shmilovich et al. | 244/214 |

(Continued)

FOREIGN PATENT DOCUMENTS

| | | |
|---|---|---|
| DE | 100 19 185 A1 | 10/2001 |
| DE | 100 19 187 C1 | 1/2002 |
| DE | 10 2004 056 537 B4 | 6/2006 |

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

Embodiments of the invention relate to an aerodynamic body with an extension in the spanwise direction, wing chord direction and wing thickness direction for coupling to a wing of an aircraft. This aerodynamic body can here be used for a leading edge flap or slat of an aircraft wing. To improve the flow characteristics, the rear side of the aerodynamic body is provided with a skin section that can be molded between a convex curvature and concave curvature.

14 Claims, 9 Drawing Sheets

(56) References Cited

U.S. PATENT DOCUMENTS

| | | | |
|---|---|---|---|
| 2001/0038058 A1* | 11/2001 | Gleine et al. | 244/198 |
| 2008/0251647 A1* | 10/2008 | Lorkowski et al. | 244/204 |
| 2010/0084508 A1* | 4/2010 | Hirai et al. | 244/1 N |
| 2010/0084515 A1* | 4/2010 | Jaggard | 244/214 |
| 2010/0258679 A1* | 10/2010 | Knacke et al. | 244/214 |
| 2010/0282900 A1* | 11/2010 | Lorkowski et al. | 244/1 N |
| 2010/0327111 A1* | 12/2010 | Sanderson | 244/99.3 |
| 2011/0024566 A1* | 2/2011 | Soenarjo | 244/131 |
| 2011/0240803 A1* | 10/2011 | Shmilovich et al. | 244/214 |
| 2011/0277815 A1* | 11/2011 | Sankrithi | 136/246 |
| 2012/0168567 A1* | 7/2012 | Soenarjo | 244/213 |

* cited by examiner

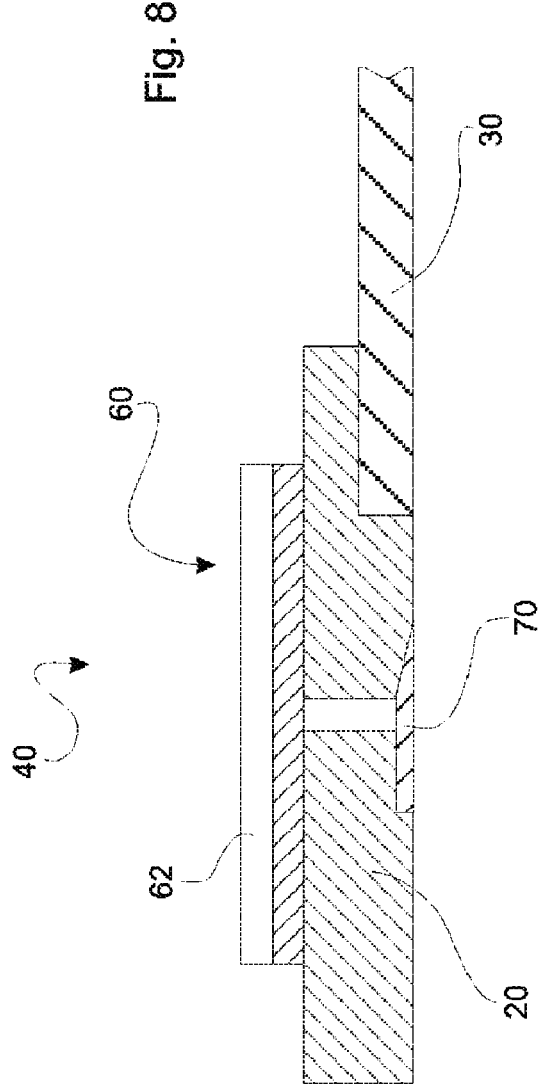
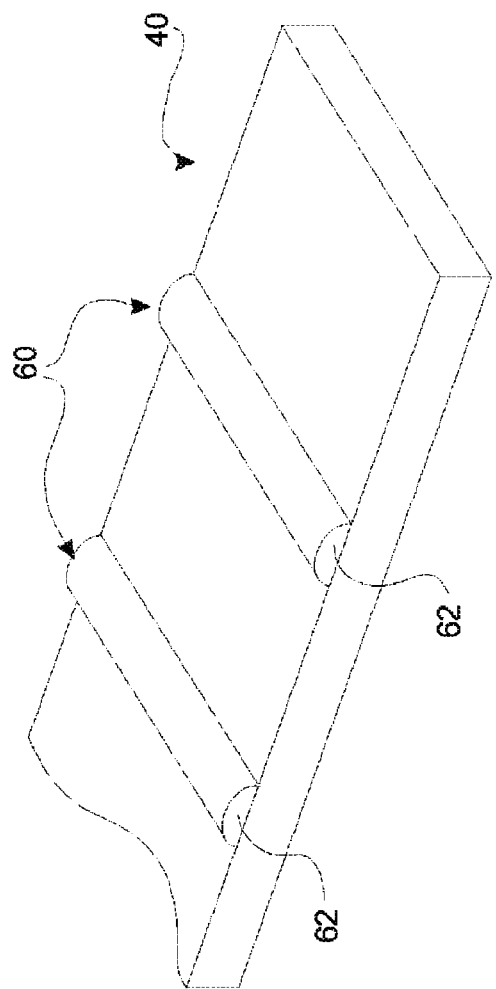

SLATS WITH A FLEXIBLE TRAILING EDGE

CROSS-REFERENCE TO RELATED APPLICATIONS

The present application claims the benefit of U.S. Provisional Application 61/362,907, filed on Jul. 9, 2010. Priority is also claimed from German Application 10 2010 026 619.1, filed on Jul. 9, 2010.

FIELD OF THE INVENTION

Embodiments of the invention relate to an aerodynamic body with an extension in the spanwise direction, wing chord direction and wing thickness direction for coupling to a wing of an aircraft. This aerodynamic body can here be used as a leading edge flap or slat of a wing of an aircraft. To improve the flow characteristics, the rear side of the aerodynamic body is provided with a skin section that can be molded between a convex curvature and concave curvature.

BACKGROUND

Aerodynamic bodies for use as a leading edge flap or slat for the wings of an aircraft are basically known in the art. These are usually movable in design, so that they can be shifted into a position spaced apart from the main wing in special flight situations, for example during a landing approach or takeoff This distance creates a gap between the aerodynamic body and main wing, through which an airflow streams. This flow supports the aerodynamic conditions by slowing the flight down and affording greater stability during landing or takeoff The disadvantage to known aerodynamic bodies is that the air flowing through the gap between the aerodynamic body on the one hand and the main wing on the other generates turbulent eddies. These turbulent eddies produce sound emissions, which are perceived as excessive noise inside the aircraft. Aside from the fact that this excessive noise can bother passengers, this shedding of turbulent eddies is disadvantageous in that it elevates the flow resistance of the airflow. An elevated flow resistance in aircraft always leads directly to economic disadvantages reflected in a higher fuel consumption. In addition, shedding eddies in the turbulent range are disadvantageous in that vibrations can arise on individual assemblies, in particular on the aerodynamic body, resulting in increased wear, in isolated cases even leading to failure situations.

SUMMARY

Embodiments of the present invention attempt to resolve the disadvantages of known aerodynamic bodies described above. In particular, various embodiments of the present invention provide an aerodynamic body that when deployed is able to reduce or even entirely avoid the formation of turbulent eddies in the gap between the aerodynamic body and main wing.

An aerodynamic body with an extension in the spanwise direction, wing chord direction and wing thickness direction for coupling to a wing of an aircraft here exhibits at least one main body structure having a front side and rear side. The front side of the main body structure is here dimensionally stable, and exhibits a convex curvature, while the rear side of the main body structure is also dimensionally stable, and exhibits a concave curvature. To prevent turbulent eddies from shedding on the rear side of the main body structure of the aerodynamic body, a skin section that serves to influence the flow on the rear side of the main body structure is provided. This skin section is joined by way of a first connecting device and second connecting device with the main body structure, and configured in such a way that the skin section is at least partially flexible. In addition, the skin section can be reversibly molded between a folded state having a first curvature and a deployed state having a second curvature. In relation to the main body structure, the two curvatures are such that at least sections of the first curvature are concave, and at least sections of the second curvature are convex. Hence, the skin section forms a flexible skin or flexible membrane, which serves to influence the flow on the rear side of the main body structure. The flexibility of the skin section is used to make the latter moldable between two dimensional states. This means that the skin section can flexibly move between these two dimensional states as extreme states. The two dimensional states here differ primarily in terms of the variety of curvature directions.

In a folded dimensional state, at least segments of the skin section exhibit a concave curvature. This means that, in the folded state, the concave curvature causes at least segments of the skin section to be tailored to the concave curvature of the dimensionally stable rear side of the main body structure. In other words, the skin section runs along the rear side of the main body structure, and in this position essentially takes up hardly any space beyond the contour of the main body structure formed by the front side and rear side. This dimensional state is assumed when the aerodynamic body in the form of a slat or leading edge flap abuts the main wing of a wing in a retracted state, meaning essentially without a gap. This situation is usually the cruising flight position of the aerodynamic body, in which the aerodynamic body itself need not perform an additional aerodynamic function, and the flow does not have to be influenced on the rear side of the aerodynamic body, in particular its main body structure.

If the aerodynamic body is now deployed in the form of a leading edge flap or a slat, meaning is moved relative to the main wing of a wing to be spaced apart from the latter, a gap arises between the aerodynamic body and main wing. Air streaming through this gap generates flow conditions that normally would lead to turbulent eddies in this gap, in particular at the rear side of the main body structure. In this situation, the skin section can be folded out into a second dimensional state, in which it exhibits a complementary curvature, specifically at least segments of which are convex. The skin section with its convex curvature in this dimensional state is spaced apart from the rear side of the main body structure with a concave curvature given the dimensional stability of the latter. Put differently, it can be stated that folding out the skin section in a folded out dimensional state makes the gap at least partially smaller, in particular causing the flow situation to change in such a way that no radical curvature change exists between the convex curvature of the front side of the main body structure and the curvature of the rear side, which is formed at least partially by the skin section.

In an aerodynamic body according to various embodiments of the invention viewed in cross section, this cross section changes when the skin section is folded out. In particular, the folding out process increases the cross sectional area of the aerodynamic body. It must further be noted that the airflow hitting the aerodynamic body is split at its front side and guided around the aerodynamic body. This is possible without any problem along the convex curvature of the front side from an aerodynamic standpoint, while a sudden change in curvature follows in the transition from the front side to the rear side in known aerodynamic bodies. Providing the skin section according to embodiments of the invention in a folded-out dimensional state reduces, or in optimal cases even entirely eliminates, this sudden change in curvature. The skin section is advantageously arranged in such a way as to occupy the convex curvature of the front side at the transition between the front side and rear side of the main body structure, and forms an essentially continuously convex curvature from the front side toward the rear side of the main body structure. This avoids the otherwise present edge between the front side and rear side owing to the sudden change in curvature, or makes it less pronounced. This yields an improved flow situation, which eliminates the shedding of turbulent eddies in proximity to the rear side, or eliminates them in the best case scenario.

It must here be noted that the aerodynamic body does not absolutely have to be movable relative to the main wing of a wing of an aircraft. Rather, it is also conceivable in an especially cost-effective configuration that the aerodynamic body is rigidly fixed with the main wing of the wing in a fixed position having a specifically defined gap relative to the latter. While this does involve the disadvantage of having to accept less favorable aerodynamic conditions in certain flight situations, the advantage is that the outlay associated with an actuator and an adjustment mechanism for the aerodynamic body can be avoided. However, an aerodynamic body is advantageously provided for movable front edge flaps or movable slats of an aircraft wing.

As already explained further above, the skin section at least partially forms the rear side of the main body structure. The flexibility of the skin section here enables a kind of variation in the rear side of the main body structure in terms of its curvature. Different embodiments are here conceivable. On the one hand, the skin section can involve a structural element separate from the main body structure. On the other hand, however, it is also possible in various embodiments of the present invention for the rear side of the main body structure to be dimensionally variable at least in part, so that the skin section can advantageously be integrated with the main body structure. In this special case, the connection devices between the skin section and rear side of the main body structure are to be interpreted as integral material bridges.

To achieve the advantageous effect according to embodiments of the invention on an aerodynamic body, at least segments of the skin section should alternate between a concave and convex curvature in the folded dimensional state to the folded out dimensional state. It can here be advantageous for the entire skin section to alternate between an overall concave and overall convex curvature between the two dimensional states, but this is not absolutely mandatory. Rather, it is also possible for only a portion of the skin section to be switched into a convex curvature while folding out the skin section into the folded out dimensional state. At other segments of the skin section, it may be advantageous for the concave curvature of the first dimensional state to also be retained in the second dimensional state. For applications where great value is placed on having the most laminar flow conditions possible at the transition between the front side and rear side of the main body structure, and the main body structure of the aerodynamic body exhibits an essentially teardrop profile, meaning converges to a point toward the back, it may be advantageous in the second dimensional state for the convex curvature to prevail only in the front area of the skin section, and for the concave curvature of the first dimensional state to remain intact in a rear area of the skin section.

In this application, "front area" and "rear area" must be understood as the respective arrangement relative to the wing chord direction of the aerodynamic body, while "front" in relation to the flow around the aerodynamic body defines the area impacted by the airflow, and "rear" defines the area where the flow again separates from the aerodynamic body.

Of course, it is also possible for the skin section to generate a plurality of curvature changes, so that an undulating structure of the skin section essentially forms the rear side of the main body structure. It is here also possible for an area with convex or concave segments to exhibit different sequential radii of curvature, in particular continuous curvature transitions between the sections.

In particular in fields of application where only segments of the skin section are to be made convex in the folded out dimensional state, it can be advantageous to adjust this curvature progression using mechanical aids. Such mechanical aids can include straps, for example, in the folded dimensional state come to lie loosely between the skin section and main body structure, and become stressed given their length with the skin section in the folded out dimensional state. Stressing such straps prevents the skin section from folding out more, so that a plurality of straps also enables complex dimensional configurations of the skin section in its folded out dimensional state.

In addition to the above definition, the arrangement of the respective connection device can be defined by the functionality and direction of flow in a "front" and "rear area" relating to the wing chord direction. A front area can also be referred to as the "inlet area" for the flow, and a rear area can also be referred to as an "outlet area". These two defined areas relate to the flow in a gap, which the aerodynamic body forms in conjunction with a main wing of a wing when using the aerodynamic body as a leading edge flap or slat. The airflow is allowed into this gap in the front area, while the airflow exits this area again in the rear area. As a result, this direction of airflow defines an inlet area and an outlet area, which can be allocated to the distinct airflow direction based on the clear flight direction when using the aerodynamic body for the wing of an aircraft. The inlet area here correlates with the front area, and the outlet area with the rear area.

The aerodynamic body according to various embodiments of the invention can be further developed to have at least one of the two connection devices exhibit an articulated axle along the spanwise direction, with which the skin section is pivoted to the main body structure. At least one of the two connection devices of such an articulated axle can here lie in both the front and rear area of the rear side of the main body structure. However, in particular in applications where a sudden change in curvature is to be avoided during the transition from the front side to the rear side, meaning that the convex curvature of the front side of the main body structure is essentially to continue uninterruptedly via a convex curvature of the skin section on the rear side of the main body structure, it is advantageous for at least the connection device to be situated in the front area or the connection device to be situated in the inlet area of the gap for the airflow.

Providing a connection device with an articulated axle makes it possible to improve the ability to mold the skin section between the folded-in dimensional state and folded-out dimensional state even further. In particular, providing an articulated axle decouples the molding process from potentially arising material stresses in the skin section itself Especially given deformations between the individual dimensional states that span relatively large distances, i.e., produce relatively large expansions, it can be advantageous to minimize the stresses in the material of the skin section by providing an articulated axle in at least one of the two connection devices. This type of situation is involved in the case described above, where the convex curvature of the front side is to be convexly carried over to the rear side without a sudden change in curvature. In an extreme case, the pivoted skin section is rotated by up to 180° at the connection site between the skin section of the rear side and the transition from the rear side to the front side, which establishes this connection site. In the process, the skin section swivels out of the folded-in state with a convex curvature around this rotational angle of 180°, uninterruptedly continuing the convex curvature with respect to the convex curvature of the front side.

It can further be advantageous for an aerodynamic body according to embodiments of the invention to be provided with an adjustment device of an actuator, which is configured in such a way to at least help fold the skin section in and/or out. As a result, such a adjustment device along with the actuator connected thereto enables a higher level of automation for an aerodynamic body, in particular a semi-automatic or even fully automatic folding in and/or out of the skin section into the folded-in or folded-out dimensional state.

In this case, the term "adjustment device" must be understood as the sum total of all features that permit a direct support of the molding process between the folded-in dimensional state and folded-out dimensional state. In particular, these include mechanical means that help the skin section to physically move between the dimensional states, either in one direction or both directions. The support can here even be so broad as to have the molding process be performed entirely by the adjustment device.

The term "actuator device" must be understood as comprising all structural features required for actuating the adjustment device. In general instances, for example, an electrical or electronic actuation can be performed, if electrically actuatable adjustment devices are provided.

For example, it is possible to help fold in or out the skin section using rotary or translatory adjustment device elements, such as small electric motors and/or gears, e.g., which can convert rotation into translation. Such adjustment devices can here also engage directly on the individual connection devices, for example directly on joints of the connection devices, or even constitute parts of these connection devices. For example, providing an electric motor makes it possible to act directly on the rotational axis of an articulated connection device, so that driving the motor in a rotational direction causes the skin section to fold out into the folded-out dimensional state, while driving the motor in the opposite rotational direction causes the skin section to fold into the folded-in dimensional state. Advantageous in cases like these are actuators that transport current or voltage to the respective adjustment devices by way of current or voltage generators and lines.

An applied voltage can also be used for a adjustment device to help mold the folded-in state or folded-out state. To this end, for example, piezo elements can be provided in the skin section, with their orientation causing power to be introduced into the skin section when a voltage is applied. These piezo elements are here connected with the skin section at attachment points, and aligned in such a way that applying a voltage to the respective piezo element causes the latter to change in length, thereby varying the distance between the two attachment points on the skin section. This variation selectively introduces forces in the skin section, which deform the skin section. A plurality of piezo elements coupled with a corresponding arrangement makes it possible to establish extremely complex curvature situations in the skin section, so that even selected three-dimensional curvature situations can be embodied by the skin section.

Another advantage to using piezo elements or other elements able to achieve a variation in length with electricity, i.e., voltage or current, is that an especially lightweight design is possible. In addition, no fault-prone mechanical assemblies are necessary, for example as would be needed for lever kinematics. However, the individual piezo elements must each be supplied with voltage, which leads to a plurality of lines. But only in special instances must each individual piezo element or individual groups of piezo elements be separately actuated, since the actuation can be performed via a simple network, and each piezo element does not need its own feed line. In this way, it would be enough to have two central ports, which can be distributed among the individual piezo elements.

As an alternative to electrical methods, it is also possible to have mechanical or combined methods, for example those involving compressed air generated in an actuator. Such methods involving compressed air will be explained in greater detail below based on two exemplary embodiments.

It is possible in one embodiment of an aerodynamic body for the adjustment device to exhibit a cavity with at least one port for coupling the cavity to a compressed air generator. The cavity can be filled with compressed air and set up in such a way as to help fold out and/or in the skin section by filling with compressed air and/or evacuation. Therefore, the simplest case involves providing a cavity, for example one extending between the skin section and main body structure. This empty volume of the cavity is minimized with the skin section in the folded-in form state, and placed under internal pressure by introducing compressed air via a port to couple the cavity with a compressed air generator. The flexible configuration of at least partial areas of the skin section causes the skin section to move toward the folded-out form state to escape the internal pressure. This process ends when the folded-out dimensional state of the skin section is reached, or when a previously defined internal pressure to be maintained has been reached in the volume between the skin section and main body structure, meaning in the cavity. It here makes no difference how the compressed air is generated in the first step.

For example, the compressed air can be generated using the compressors provided specifically for the aerodynamic bodies. Such compressors or pumps can be situated both in the main body structure of the aerodynamic body itself, but also secured outside of the latter, and connected by compressed air lines with the port of the cavity.

It may also make sense to forgo such heavy pumps and compressors, which increase the complexity, and hence the cost, for example by making use of existing compressed air. For example, compressed air from the engines situated under a wing of an aircraft can be guided to the port of the cavity via corresponding line systems. The prudent use of valves makes it possible to introduce the compressed air supplied by the engine into the cavity in a specifically controlled manner.

When using compressors, it also becomes possible to actively evacuate the cavity. Hence, active evacuation generates a vacuum in the volume between the skin section and main body structure. This vacuum reverses the molding process, so that the skin section is moved back from a folded-out dimensional state into the folded-in dimensional state. In other words, the skin section is sucked back into its folded-in dimensional state.

It can also be advantageous to limit the volume of the cavity, so as to minimize the level of compressed air required for helping fold the skin section out or in. For example, it is possible to provide the cavities in the skin section itself Similarly to the air chambers of an air mattress, their alignment can define a final shape of the skin section, and hence its folded-out dimensional state. In this way, the cavities in the skin section can be formed by multi-layer membranes, which have defined connection sites, thereby yielding interlinked hose or channel-like structures. This makes it possible to introduce compressed air into this channel network by way of a single port. In other words, this "air mattress concept" involves pumping up the hose network or channel network, thereby achieving a partially stable structure in the skin section, which is otherwise flexible. This structure is here responsible for the final shape in the folded-out dimensional state. It is defined by the arrangement, alignment and exact position of the individual channels or cavities relative to each other, and in relation to the extension of the skin section. In other words, this air mattress concept can be used to define an essentially dimensionally stable, folded-out dimensional state, which again becomes flexible when the compressed air is let out. These processes are reversible, so that both the dimensionally stable folded-out dimensional state and the folded-in dimensional state can be achieved as frequently as desired. Two independent air channel systems are also possible, which are each allocated to one of the two dimensional states or define the latter. In this way, alternatively pumping in and letting off compressed air makes it possible to actively mold both dimensional states.

It can be advantageous in an aerodynamic body according to embodiments of the invention for the adjustment device to exhibit at least one bubble structure with a cavity, which is supported against the main body structure and arranged in such a way as to support the skin section as it folds out and/or in during inflation with compressed air and/or evacuation. For example, such a bubble structure can be designed like a balloon, meaning exhibit a flexible outer skin consisting of one of more components, which have been merged together to form a single bubble structure. This bubble structure also exhibits a compressed air filling port, for example for connection to a compressed air generator. If compressed air is now introduced into the bubble structure as described further above in relation to the cavity between the skin section and main body structure, the bubble structure fills, and the membrane enveloping the bubble structure is moved to its final shape. In other words, the bubble structure is inflated, and hence switched to its inflated structure. In the simplest case, expanding the bubble structure through inflation forces the skin section out of its folded-in dimensional state, and automatically moves it further into the folded-out dimensional state after it has reached a deflection point. It is here especially advantageous if both the folded-in dimensional state and folded-out dimensional state statically represent essentially stable positions of the skin section. As a result, the respective dimensional state can be maintained without applying force. The switch from one dimensional state to another also only has to be executed up to the respective deflection point, since the skin section automatically deforms into the respective position that is closer in terms of stability after this deflection point, meaning either deforms further into the folded-in dimensional state or folded-out dimensional state. Put differently, the skin section snaps through at a certain deflection point so as to reach its stable end position.

However, it may also be advantageous in individual cases for the folded-out dimensional state to be an unstable dimensional state, for example one that tends to move back into the folded-in position, e.g., owing to material stresses present in the skin section. For example, this can be adjusted by correspondingly configuring the connection devices. At least one of the connection devices can be fixed in place, for example, meaning that a relative motion can be achieved between the skin section and main body structure at this position only if one of the two elements is elastically deformed, meaning as the result of the flexibility of the skin section, mainly through the deformation of the skin section. In such a case, an internal stress comes about during conversion into the folded-out dimensional state within the skin section, which exerts a directional force on the skin section that would deform the skin section itself back into the folded-in dimensional state, provided no force applied from outside were to cancel out this restoring force vector. Using a bubble structure makes it possible to generate such a counterforce, and hence to move the skin section into its folded-out dimensional state by inflating the bubble structure. In addition, a targeted discharge of air from the bubble structure, i.e., a targeted evacuation, enables a targeted variation of the force vector, which counters the restoring force in the material of the skin section. In this way, the skin section can be automatically restored to the folded-in dimensional state during evacuation. This is done through a combination of evacuation and material stresses in the skin section when in the folded-out dimensional state.

Aside from the fact that only a fraction of the air volume is required in the variant with a bubble structure for supporting the process of folding out and/or in by comparison to the entire volume between the skin section and main body structure, so that a reduction in the dimensions of the bubble structure can also take place in the extension in the spanwise direction of the aerodynamic body. For example, it is enough for one or more bubble structures to be distributed in the spanwise direction over 50% to 60% of the extension of the aerodynamic body of the spanwise direction [sic]. As a consequence, a one or several-part bubble structure can be distributed over the spanwise direction, and sectionally apply the corresponding force in support of the folding-out process.

In situations where no material stress is desired or possible in the skin section, the bubble structure can also be actively used to fold in the skin section. In such a case, the bubble structure is secured both to the main body structure and the skin section, so that an evacuation, i.e., siphoning the air out of the bubble structure, contracts the structure of the bubble structure. Hence, the reduction in volume, and hence the reduction in outer dimensions, of the bubble structure causes a contraction of the bubble structure, which brings these two assemblies closer together again due to its attachment both to the main body structure and skin section. In other words, the contracting bubble structure retreats back into its folded-in dimensional state during evacuation.

In particular in terms of the situation with respect to stress in the material of the skin section, it can be advantageous in various embodiments of the present invention for the skin section to be designed in such a way as to be essentially free of stress in a intermediate adjustment state between the folded-in dimensional state and folded-out dimensional state. This central state between the folded-out and folded-in dimensional state can here represent an essentially flat extension of the skin section, for example. A flat extension here implies that the skin section exhibits an essentially flat extension before it is integrated into the aerodynamic body. Whether this flat extension can ever arise after integration in the aerodynamic body is here irrelevant. However, this makes it easy to fabricate the skin section, since a flat manufacturing method is sufficient, and no curvature needs to be considered during production. Rather, the respective curvature of the respectively folded in or folded out dimensional state sets in automatically after integration into the aerodynamic body.

The "intermediate adjustment state" between the folded in and folded out dimensional state can also be understood as a central line that arises when all points on the respective line for the folded-in dimensional state and folded-out dimensional state are interconnected in the direction of the wing thickness, and when the midpoint for each of the connecting lines, meaning the point that exhibits an identical distance in both directions relative to the folded-in dimensional state and the folded-out dimensional state, is interconnected. This yields a curved central line, which is ideally passed through by the skin section during the movement from the folded-in to the folded-out dimensional state.

Regardless of whether the stress-free situation of the material in the skin section is present along an ideal intermediate adjustment state or along an essentially flat extension, such a configuration is advantageous in that the deformation paths for reaching both the folded-in dimensional state and folded-out dimensional state are minimized in relation to the maximum deformation paths between these two dimensional states. Each individual point of the skin section must only traverse the respectively shortest distance from the stress-free state in both one and the other direction. Since the traversed path from the stress-free situation to the respectively valid dimensional state correlates directly with the stress arising in the material, an embodiment according to the invention makes it possible to reduce the maximum material stresses in the skin section. This makes it possible to use materials for the skin section that are distinctly lighter, since they are thinner, and reducing the maximum stress in the material of the skin section also increases its long-term stability. The probability of damage caused by excessive stress in the skin section is also reduced further by reducing the maximum stresses in the material of the skin section.

Depending on the application, different materials can be used for the skin section. Of course, it is here also possible to use individual materials in combination. Such a combination can involve stacking various layers, i.e., forming layers of the skin section in the thickness direction of the skin section. Another possibility has to do with having different regions over the progression of the skin section consist of various materials. This is especially advantageous in cases where different areas of the skin section are to exhibit various curvatures, or must withstand different loads owing to material stresses. For example, the materials can be selected from the following list:

Titanium,
Aluminum,
High-grade steel,
Fiber composite with epoxy matrix,
Fiber composite with thermoplastic matrix,
Fiber composite with silicone matrix.
A fiber composite must here be understood to mean that use has been made of fiberglass composites (FGC) or hydrocarbon composites (HCC), i.e., a composite of the respective fiber with a plastic. These are impregnated with a corresponding matrix, for example one consisting of epoxy resin, thermoplastic or silicone. However, use can also be made of metals, such as titanium, aluminum or high-grade steel, which are improved in particular via processing to form an alloy.

Different material thicknesses can be set depending on the respectively selected material and the actually present stress state in the material. In particular, a skin section thickness of 0.2 mm is possible as the minimum thickness, and up to 3 or even 4 mm as the absolute maximum thickness. At greater thickness, it becomes difficult to ensure the flexibility of the skin section, hampering a conversion between a folded-in dimensional state and a folded-out dimensional state. A smaller thickness for the skin section poses problems with regard to the necessary long-term strength in terms of the material load during the deformations.

It may be advantageous in various embodiments of the present invention for at least one of the connection devices to be designed as a rotary joint, which allows the skin section to execute a folding motion at the attachment site by at least 120° around the rotational axis of the rotary joint. For example, such a rotary joint, meaning a joint for establishing a rotational axis, can here be configured as a piano hinge in the direction of the spanwise direction of the aerodynamic body. However, the latter does not have to extend over the entire spanwise direction of the aerodynamic body, but rather can also be provided at points or in sections. The advantage to enabling a rotational range of 120° is that a folding between a convex curvature and concave curvature can also take place even directly at the attachment site, meaning within the connection device. In a manner of speaking, the connection device outfitted in this way assists in the sudden change between the convex curvature and concave curvature. This enables a configuration without a sudden change in curvature within the connection device, meaning at the hinging point, which can also define the transition between the front and rear side of the main body structure, for example. In this way, a necessary sudden change in curvature in the folded-in dimensional state can be brought about, while in the folded-out state, the convex curvature of the front side can be continued again by a convex curvature of the rear side, formed by the skin section. The 120° range of rotation here represents only a minimum. It is especially advantageous for the pivoting range to permit 120° or more, meaning up to 150°, or even up to 180°.

It can also be advantageous to provide a stop in one or both directions, which either allows assemblies in the connection device to hit it, or stops the skin section itself. Such a stop prevents the connection device from excessively pivoting or rotating, thereby averting any possible damages to the connection device resulting from such excessive pivoting. In the simplest case, the stop can consist of a stop surface, which correlates with a corresponding surface of the connection device and/or the skin section, thereby preventing a rotation beyond the folded-in dimensional state or folded-out dimensional state.

As an alternative to the mechanical hinge configuration, for example the piano hinge, a rotary joint of a connection device can also be flexible in design. For example, it is possible for a type of flexible belt strap or other flexible material to join together two assemblies, so that a gap exists between the two assemblies, and the two assemblies are connected with each other by means of a flexible strap that spans these two assemblies. In this way, the two assemblies forming the two leaves of the hinge can be rotated relative to each other. The rotational axis is here not structural in design, but rather is functionally established in the spanwise direction along the gap between the two assemblies. While this flexible strap can here be directly between two assemblies in the form of hinge assemblies, the two hinge assemblies can also be integrally configured with the skin section on the one hand and the main body structure on the other. Therefore, the simplest approach involves stretching a flexible belt strap or other flexible element across a gap between the skin section on the one hand and main body structure on the other. The fixed connection between the flexible element and the respective hinge assembly or main body structure and skin section allows the skin section to rotate around the corresponding rotational axis, and hence move back and forth between the folded-in dimensional state and folded-out dimensional state.

When using a flexible element for the hinge, it is also possible in particular for the adjustment device described further above to become part of the hinge. This permits the adjustment device to engage directly at the respective hinge or connection device and impart a rotational force to the respective assembly of the connection device to support the process of folding the skin section out and/or in, which also holds true, of course, for mechanical configurations in the form of piano hinges.

It is further advantageous to provide reinforcing elements in or on the skin section of an aerodynamic body according to embodiments of the present invention, which are used to partially brace the skin section. These reinforcing elements exert their effect by virtue of their structure, which is comprised of materials having a lower flexibility than the remaining skin section, for example, and also through their orientation. For example, it is possible for the skin section having a curvature, both convex and concave, to be designed as a simple curvature. In such an embodiment, it makes sense to stabilize the skin section in the spanwise direction of the aerodynamic body. As a consequence, exclusively straight lines are present in the spanwise direction of the aerodynamic body given a simple curvature of the skin section. Reinforcing elements can run along these straight lines in the spanwise direction, for example forming reinforcing lamellae. These reinforcing elements can here consist of reinforced plastic profiles or reinforced fiber composites, for example, which exhibit their maximum expansion in the spanwise direction of the aerodynamic body. Similarly to window blinds, this gives rise to a structure for the skin section that permits any kind of curvature, but achieves a high enough stability in the spanwise direction to avoid curvatures in this direction.

The above stabilization achievable by way of reinforcing elements can additionally or alternatively also be attained by having the skin section exhibit sections of varying thickness over its progression transverse to the spanwise direction. The thickness levels here relate to the gauge of the skin section, as it were, which can vary between 0.2 mm at the thinnest locations and up to 4 mm at its thickest locations, for example. Thicker sections of the skin section are correspondingly more difficult to deform than thinner skin sections. It has been found to be advantageous in particular for a thicker section to predominate in the outlet region of the gap behind the aerodynamic body or in the rear area of the skin section. For example, this segment of the skin section is to be provided with a thickness of 3 to 4 mm. Moving away from this segment of the skin section toward the inlet area of the air gap behind the aerodynamic body, i.e., toward the front, the skin section will advantageously exhibit a smaller thickness, for example 0.5 or 1 mm or even less. It is here also possible that an undulating thickness structure will essentially come about, meaning that, on the way from the rear end of the skin section to the front end of the skin section, a segment of the skin section with a larger thickness will be followed alternately by skin sections of a smaller and larger thickness.

A segment of the skin section is advantageously to be provided with a smaller thickness at the front end of the skin section, i.e., in the inlet area behind the aerodynamic body in relation to the air flow in the gap, since the biggest deflection region must be established at this position during the forming process between the folded-in dimensional state and folded-out dimensional state. The stresses in the material must be cut to a minimum at this site, so that a smaller material gauge also enables lower material resistances, and hence lower material stresses.

It is further advantageous for the first connection device and/or second connection device to be equipped with sealing materials, which seal the volume between the skin section and main body structure to the outside. In particular in embodiments where the process of folding out or in between a folded-in dimensional state and folded-out dimensional state of the skin section is supported by pressurizing a cavity, a seal like this can make sense. Embodiments where the internal pressure is applied in the entire volume between the skin section and main body structure to support the act of folding out into a folded-out dimensional state, such sealing materials are most often even required. Without these sealing materials, not only would the compressed air be largely unable to escape, but the flow passing the outside of the respective gap and holes would give rise to a vacuum at the respective holes over the existing gap and holes, which would again siphon the excess pressure in the cavity in support of the folding out operation.

In addition to the airflow, these sealing materials can also be used to establish a seal against impurities. In particular, the goal is to prevent contaminants, in particular solid or liquid contaminants, from getting into the volume between the skin section and main body structure. This must be averted, since the interior of this volume might otherwise be subjected to damage that would not be discernible from outside during maintenance work. As a consequence, providing such sealing materials not only improves automatability, but also increases the safety of an aerodynamic body according to embodiments of the present invention.

It can further be advantageous for simplifying the process of folding the skin section into the folded-in state to achieve a temporary airflow leak, at least in segments of the skin section. For example, this temporary leak can be introduced by way of valve systems, or using intelligent, so-called "smart materials", which can set varying porosity levels through the application of electrical voltage, thereby yielding open or closed regions. These segments with a temporary leak are advantageously located in the rear area of the skin section, meaning in the outlet area in relation to the air gap between the aerodynamic body and main wing of a wing. If the skin section is in the folded out state, and the intent is to return it to the folded in state, the temporary leak can be generated in different ways, for example by applying voltage to piezo elements acting as valves. When the corresponding piezo valves open, a Venturi effect, which is generated by the airflow streaming by in the air gap between the aerodynamic body and main wing of a wing, creates a vacuum at the openings, which siphons air out of the volume between the skin section and main body structure. The vacuum arising in this volume sucks the skin section back into its folded-in dimensional state, so to speak, and produces an evacuation of the cavity.

It can also be possible for at least one of the connection devices to be configured as a fixed connection, designed in such a way that the skin section and main body structure run parallel to each other at the connection site. Hence, this fixed connection is an alternative to the articulated design of the connection devices described further above. In particular, it can be advantageous for this fixed connection to be provided in the rear area of the skin section, meaning in the outlet area relative to the flow in the gap between the aerodynamic body and main wing of a wing. The advantage to projecting in this rear area is that a kind of asymptotic approximation of the skin section to the main body structure takes place there. This asymptotic approximation is usually accompanied with a concave curvature of the skin section in this area. Therefore, the concave curvature of the skin section in this area corresponds less to the concave curvature of the main body structure in this area when it is in the folded-out dimensional state, and more so when it is in the folded-in dimensional state, but is concave in both dimensional states. The distance that the skin section must traverse in this area between the two dimensional states is thus distinctly smaller than in other segments of the skin section.

For example, the fixed connection between the skin section and main body structure can be achieved through adhesive bonding, but also through joints, such as rivets or bolts. Positive connection methods, such as vulcanizing or welding, can be implemented depending on the material used and the skin section, and for the main body structure. The use of a diffusion welding procedure at this position is also conceivable. Another advantage to using fixed connections is the possibility of introducing stresses into the material of the skin section in the rear area. As also explained extensively further above, such stresses in the material can be used to induce restoring forces on the skin section to move back into the folded-in dimensional state. These stresses are hence braced against the fixed connection in the connection device, and generate a force vector or a torque, which attempts to move the skin section back to its folded-in dimensional state.

Embodiments of the present invention also relate to a wing with a main wing and at least one aerodynamic body according to embodiments of the invention as discussed above. The aerodynamic body according to embodiments of the invention here comprises a slat or leading edge flap, and can move relative to the main wing of the wing, at least in the wing chord direction. In this way, a gap can be generated between the slat or leading edge flap and the main wing, wherein the first curvature with the skin section in the folded-in state runs along the curvature of the leading edge of the main wing corresponding thereto. In other words, both the rear side of the main body structure of the aerodynamic body and the leading edge of the main wing of the wing are provided with a corresponding, correlating curvature. This means that the rear side of the main body structure is concave, and the leading edge of the main wing is convex. Hence, the material thickness of the skin section nestled in between with the aerodynamic body in the retracted state advantageously exhibits what is also an identical curvature, so that it is also convex relative to the main body structure, or also concave relative to the front side of the main wing.

In the ideal case, the skin section here abuts the entire surface of both the rear side of the main body structure and the leading edge of the main wing with the aerodynamic body in the retracted state, meaning in the state where there exists no gap between the aerodynamic body and main wing. As a result of this configuration, the skin section jibes quite well with the aerodynamic concept of the entire wing with the aerodynamic body in a retracted state, but can achieve its aerodynamic effect as elucidated at length above while deploying the aerodynamic body, meaning when forming a gap between the aerodynamic body on the one hand and the main wing of the wing on the other.

Embodiments of the present invention also relate to an aircraft, which exhibits at least two wings according to wing embodiments of the present invention discussed above. In this case, the actuators in such an aircraft are advantageously arranged outside the aerodynamic body. In particular when using compressed air to support the establishment of the folded-in dimensional state or folded-out dimensional state of the skin section, lines are provided that transport compressed air to the respective adjustment devices in the aerodynamic body. For example, the actuators can be provided in the form of pumps at other positions of the aircraft. It is also possible for already existing systems, for example, the air conditioning system or engines of the aircraft, to provide the air necessary during conversion into the folded-out dimensional state of the skin section.

The skin section can here be configured as a fiber composite work piece, and be manufactured, for example, using a method for fabricating such a fiber composite work piece involving the following steps:

Arranging at least two mats comprised of fibers one atop the other,

Joining the at least two mats together to form a porous mat composite,

Fabricating a mixture of liquid, cross-linking silicone with at least one volatile diluent, which exhibits a lower viscosity than the silicone by itself Inserting and immersing at least one mat composite into the mixture, and Curing by cross-linking the silicone and evaporating the diluent.

Such a method makes it possible to manufacture a mechanically stable and simultaneously flexible fiber composite work piece, wherein a liquid, cross-linking silicone is here used to generate the matrix of the fiber composite. In the process, the silicone imparts enough structural integrity to the entire fiber composite work piece in its function as the matrix structure, wherein it derives its mechanical stability from the orientation and selected material of the respective fibers, while the silicone itself introduces the property of flexibility into the material. It was here surprisingly discovered that silicone, which usually serves as a separating agent in similar procedures, meaning as a material intended to prevent a connection between the fiber composite work piece and a work piece device, can here perform the opposite function, i.e., acting as a connecting material. It was further surprisingly discovered that the silicone alone can only penetrate into a complex structure of a mat composite under difficult conditions. The penetration by the silicone into the structure of the mat composite is here primarily driven by the capillary forces within the mat structure. The penetration rate or penetration depth here depends not least on the viscosity of the penetrating material, meaning the silicone mixture, as well as the surface tension and its contact angle with the surface of the fibers.

Penetration into the structure of the mat composite is here facilitated in particular when a lower viscosity is present by comparison to a higher viscosity of the silicone by itself As a consequence, providing a volatile diluent eases penetration, or even the process known as infiltration, of the mat composite. In this way, only the combination of a diluent that also happens to be volatile with a liquid, cross-linked silicone makes it possible to arrive at a fiber composite work piece exhibiting a high mechanical stability and concurrently high flexibility.

Specifically, use will here often be made of an additively cross-linking silicone, and hence one comprised of several components. In order to fabricate the mixture, the respective components of the additively cross-linking silicone are mixed together in a first step, for example meaning that a mixture consisting of 85% of a first component and 15% of a second component of an additively cross-linking silicone are blended together. All components can here be silicone itself, but also substances that assist in cross-linking. This point in time in the process of mixing the individual components marks the start of the so-called "pot life", within which the silicone remains processable. In other words, this pot life corresponds to the maximum processing period within which cross-linking of the silicone has not yet proceeded to a point where it would hamper an infiltration of the silicone mixture into the mat composite. In a manner of speaking, the pot life corresponds to the time required to cure the silicone, but not to the point of complete cross-linking, and instead to a level that no longer permits processing via infiltration. However, the mixture of multi-component silicone, in particular of an additively cross-linking silicone, is in this state still characterized by a relatively high viscosity, despite its liquid aggregate state. Because of this high viscosity, the silicone will infiltrate a complex structure of a mat composite, but this infiltration will yield only a slight degree of penetration through the mat composite. As a consequence, there here remain areas in the mat composite where a matrix of silicone forms only incompletely or not at all. In other words, there are still areas in which the fibers are not enveloped by a matrix, so that the individual fibers are correspondingly not fixed in a matrix relative to each other. However, without a completely formed matrix, neither the flexibility nor the mechanical stability is achieved to the extent needed at such locations. As a result, imperfections in the material remain behind given an inadequate infiltration of the matrix agent, which in the worst case scenario can cause an assembly made out of the latter to fail.

Therefore, it would make sense to increase the degree of infiltration. This is achieved by adding a volatile diluent to the silicone, so that the entire mixture consists of a mix of the components in the additively cross-linking silicone on the one hand, and the diluent on the other. The viscosity of the mixture is here lower than the viscosity of the silicone or silicone composition alone. In other words, the diluent diminishes the viscosity of the mixture, thereby simplifying one of the primary mechanisms for penetrating the mat composite, specifically through infiltration via capillary forces. In addition, the cross-linkability of the individual fibers is improved by lowering the viscosity. In summary, it was surprisingly discovered that reducing the viscosity with a diluent tangibly facilitates infiltration of the silicone during the pot life, and hence improves or accelerates it. The higher degree of penetration owing to improved infiltration generates fewer imperfections in the material, and hence yields an assembly comprised of fiber composite that is mechanically more stable and less susceptible to flaws. In other words, an improved fiber composite work piece is obtained for use as a skin section.

The use of such diluents had previously only been conceivable under difficult conditions of use, if at all, since the diluent itself exerts a disruptive effect in the formed matrix structure of a fiber composite tool. This diluent would remain there, gradually evaporating with usage of the assembly, e.g., leak out over a prolonged period of time. Such a leakage would be correlated with a subsequent contraction of the fiber composite tool, meaning with a shrinkage of the component. Residual liquid diluent within the fiber composite work piece is also disadvantageous, since the aggregate state of the diluent can change given large temperature fluctuations, and different volume expansions can generate material stresses, going as far as cracks forming in the fiber composite work piece. Therefore, a volatile diluent is used as the diluent, and the diluent is subjected to an evaporation step in the present method before, after or while curing the silicone via cross-liking. This evaporation step can vary depending on the type of diluent. For example, it is possible that waiting for a defined period of several hours up to several days is sufficient given rapidly volatile diluents, after which the bulk of the liquid diluent will have evaporated. For example, this can take place at room temperature, i.e., at 20° C. Higher temperatures are also conceivable depending on the type of liquid diluent, e.g., 25° C., 30° C., 35° C., 40° C., 45° C., 50° C., 55° C., 60° C., 65° C., 70° C. higher. However, care must here be taken to ensure that the temperature selected for evaporating the liquid diluent does not exceed or approach the flashpoint of the liquid diluent. This reduces the danger of explosion or fire during implementation of the method.

Another essential component of the described method for fabricating a fiber composite work piece for use as a skin section involves the step of inserting and immersing at least one mat composite into the mixture. Immersion must here be understood to mean that the mat composite is in a position in which it is surrounded on all sides by the mixture. In particular, the mat composite is here situated under the surface of a liquid level of the mixture in relation to said liquid level. As a consequence, the mixture can penetrate into the work piece from all sides. The existing infiltration surface is thereby increased. By comparison to situations in which material is supplied only from one side, the surface available for infiltration is even essentially doubled. It must here be noted that the immersion process can take place via different relative motions. For example, the mat composite can be actively immersed into an existing bath comprised of a mixture, under the liquid level of this mixture. However, the reverse is also conceivable, in that a mat composite located in a bath or tool mechanism can be flooded with a mixture, which reaches a level corresponding to the immersed state of the mat composite.

It may also make sense for immersion to take place at different rates. For example, immersion can take place quickly, pretty much simultaneously with the placement of the mat composite into the mixture. However, a time lag or delay is also conceivable, so that the mat composite is immersed over a defined timeframe. The infiltration process here starts at the already immersed sections of the mat composite even while immersion is underway. In particular given a relatively thick mat composite, this can be advantageous, since any fluids that still remain in the mat composite, in particular gases like air, can escape through the segments not yet immersed. Therefore, a degassing or venting is possible during immersion.

The at least two mats comprised of fibers can here be arranged in different ways. Individual, essentially flatly aligned fibers that lie next to each other and are not connected with each other, are also to be understood as mats, like an extension essentially into two spatial dimensions of different fiber directions that already exhibit a first cross-linking with each other. At least two such mats are placed one over the other, wherein the orientation of fibers in the respective mats can vary relative to each other. For example, the fibers in the respective mats can be arranged at an angle relative to each other, e.g., at 90° angles to each other, or at 30° or 60° angles to each other. Stacking the mats defines a porous structure of the mat composite. The areas between the individual fibers, both inside the mats and between the mats, here define pores that are each connected with respectively adjacent pores. In other words, the mat composite can also be referred to as spongy or porous. It is therefore absorbent.

It is here very advantageous for the mat composite to be so porous as to not incorporate any closed pores. This means that no pores are present that can no longer be reached from outside the mat composite. Rather, this case involves an open-pore configuration, in which essentially each cavity, meaning each pore, in the mat composite is connected with other pores via a pore network with the outside of the mat composite. At least theoretically, this conceivably allows for a one hundred percent infiltration with the silicone mixture. The interconnected pores hence form fluid channels or infiltration channels or flow channels for the mixture.

By combining silicone for cross-linking, and hence for matrix formation, on the one hand and fibers for generating mechanical stability on the other, fiber composite work pieces can be fabricated that exhibit the known mechanical stability of fiber composite work pieces, while additionally having a flexibility previously unknown for such work pieces. As a consequence, such fiber composite work pieces represent very good candidates for use in skin sections according to embodiments of the invention.

BRIEF DESCRIPTION OF THE DRAWINGS

Various embodiments of the invention will be described in greater detail based on the attached drawings in the figures. In this case, the terms "top", "bottom", "left", and "right" used below refer to an alignment of the figures with normally readable reference numbers. Shown in:

FIG. 3a is a diagrammatic side view of another embodiment of an aerodynamic body according to embodiments of the invention;

FIG. 3b is an isometric, diagrammatic view of the embodiment according to FIG. 3a;

FIG. 8 is another embodiment of an articulated connection device;

FIG. 9 is an isometric view of the articulated connection device on FIG. 8; and

DESCRIPTION

In order to explain the respective directions for the following description of embodiments as a function of the high-lift system, the individual directions are defined as follows. A wing chord direction FTR, a spanwise direction SWR and a wing thickness direction FDR are defined for the aerodynamic body 10. The three directions together comprise a coordinate system, which is fixed in place relative to the aerodynamic body 10.

Figure 1A:
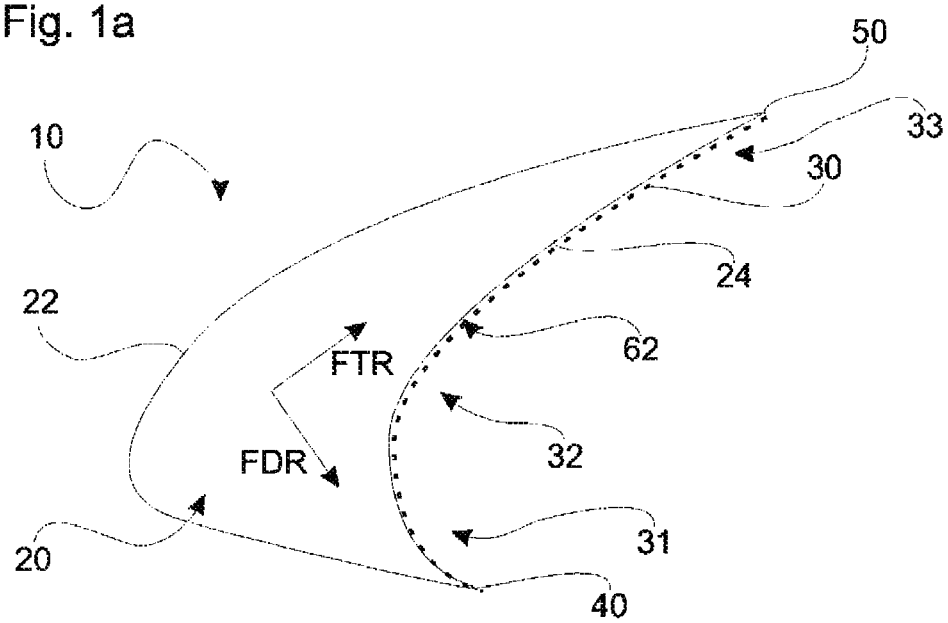
FIG. 1a is a diagrammatic cross section of an embodiment of an aerodynamic body with the skin section in the folded-in dimensional state.
Figure 1B:
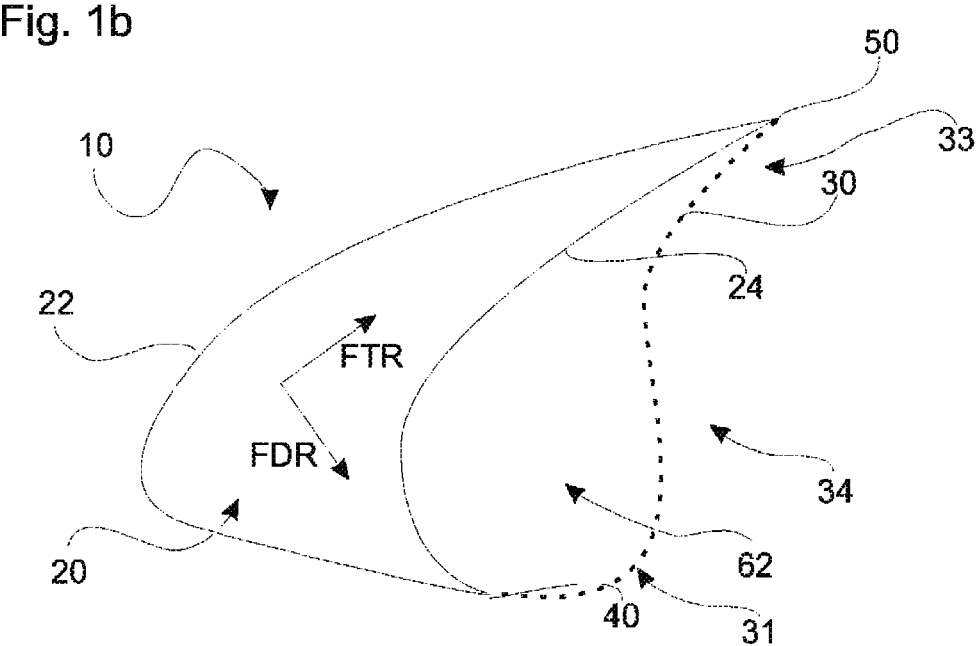
FIG. 1b is the embodiment according to FIG. 1a with the skin section in the folded-out dimensional state.

FIGS. 1a and 1b show the two extreme states of the skin section 30, meaning the folded-in dimensional state 32 and the folded-out dimensional state 34. These two extreme situations will be used to explain how the aerodynamic body 10 basically works.

FIG. 1a shows the aerodynamic body 10, which exhibits a main body structure 20 for reinforcement purposes. This main body structure 20 has a dimensionally stable front side 22 with a convex curvature. The rear side 24 of the main body structure 20 is also dimensionally stable, and concavely curved. This aerodynamic body 10 involves a leading edge flap or leading edge wing, for example of the kind used in a wing 100 as depicted on FIG. 5.

The situation illustrated on FIG. 1a here involves in particular the situation designed for the state of the leading edge flap, meaning of the aerodynamic body 10, in which the wing 100 is in the retracted state. In order to ensure that the rear side 24 of the main body structure 20 fits the contour of the corresponding main wing 110 of the wing 100, the skin section 30 on FIG. 1a is depicted in its folded-in dimensional state.

If the leading edge flap, meaning the aerodynamic body 10, is now deployed, for example during landing or takeoff, a gap arises between the rear side 24 of the main body structure 20 and a leading edge 112 of the main wing 110 of the wing 100. This gap guides an airflow that improves the aerodynamics in relation to the flight situation during approach and/or takeoff However, the incoming air streaming along the first connection site 40 in the gap between the rear side of the main body structure 20 and the leading edge 112 of the main wing 110 causes the shedding of turbulent eddies, which in turn lead to noise emissions. The area in relation to the direction of flow in the gap after the first connection device 40 is here the front area 31 or inlet area, while the area in relation to the direction of flow in the gap before the second connection device 50 is the rear area 33 or outlet area.

As a result, the first connection device 40 is the location of the inlet area, or the front area 31 of the skin section 30 in relation to the wing chord direction of the aerodynamic body 10. By contrast, meaning in the second connection device 50, the rear area 33 of the skin section 30 or outlet area for the airflow is located in the gap between the aerodynamic body 10 and main wing 100.

If the aerodynamic body 10 has been completely deployed, it is advantageous that the shedding of turbulent eddies be reduced or avoided in proximity to the connection device 40, meaning in the inlet area in the gap between the aerodynamic body 10 and main wing 100, so as to prevent noise emission and/or vibration. To this end, the skin section 30 is moved into a position as depicted on FIG. 1b. This position is referred to as the folded-out dimensional state 34 of the skin section 30. This folding out process enlarges a cavity 62 between the skin section 30 and rear side 24 of the main body structure 22.

As shown by a comparison of FIGS. 1a and 1b, the latter differ predominantly by the cross sectional contour of the skin section 30. When the skin section 30 is in the folded-in dimensional state 32 as shown on FIG. 1a, it is provided exclusively with a concave curvature between the connection device 40 in the front area 31 and the second connection device 50 in the rear area 33. The concave curvature varies in intensity. The curvature tapers as the skin section proceeds from the front area 31 toward the rear area 33. Visible on FIG. 1b is a more complex curvature between the two connection devices 40 and 50 in the rear and front areas 33 and 31. Tracing the skin section 30 from the front area 31 to the rear area 33, a relatively strong convex curvature is initially provided, which proceeds past an inflection point and changes into a concave curvature in the rear area 33 of the skin section 30. As also evident from FIG. 1b, the convex configuration in the front area of the skin section 30 yields a transition between the front side 22 of the main body structure 20 to the skin section 30, in particular at the junction of the connection device 40, which essentially takes place without any sudden change in curvature. The uninterrupted continuation of the contour of the main body structure 20 in the area of the connection device 40 reduces the shedding of turbulent eddies, or prevents this shedding entirely.

Figure 2:
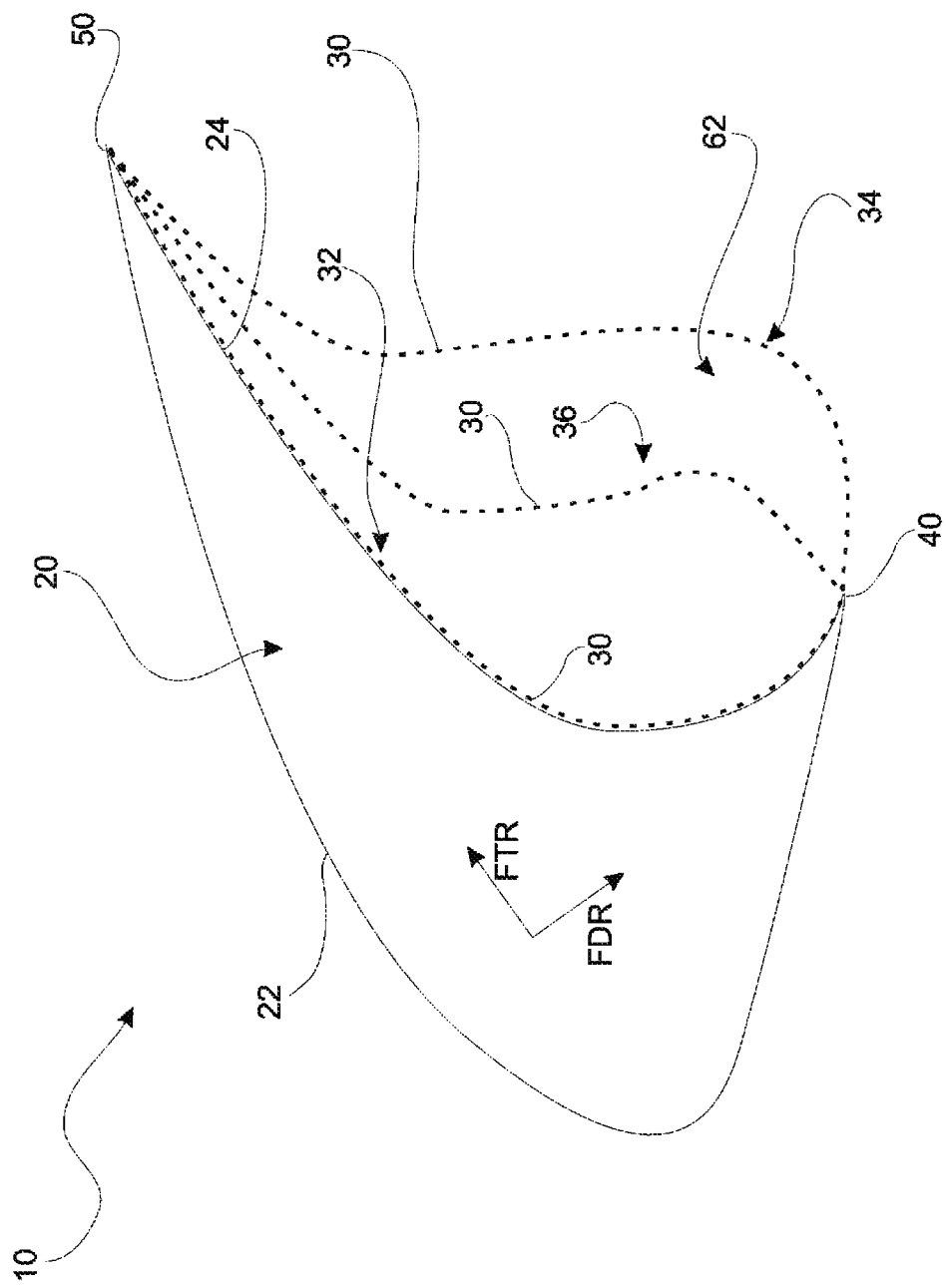
FIG. 2 is the embodiment according to FIGS. 1a and 1b, with correlated folded-in dimensional state, folded-out dimensional state and an intermediate state of the skin section.

FIG. 2 mentions a way in which the skin section 30 can be moved from its folded-in dimensional state 32 into its folded-out dimensional state 34. This case involves the embodiment of the aerodynamic body 10 with a main body structure 20 having a front side 22 and a rear side 44 that was already explained on FIGS. 1a and 1b. However, a single graphic depiction shows three states of the skin section 30 on FIG. 2. Both the two extreme states, meaning the folded-in dimensional state 32 and the folded-out dimensional state 34 are shown, along with a state 36 lying in between. The state 36 lying in between must here be construed as an example, which the skin section will run through in this or a similar way while moving between the folded-in dimensional state and folded-out dimensional state.

Figure 4:
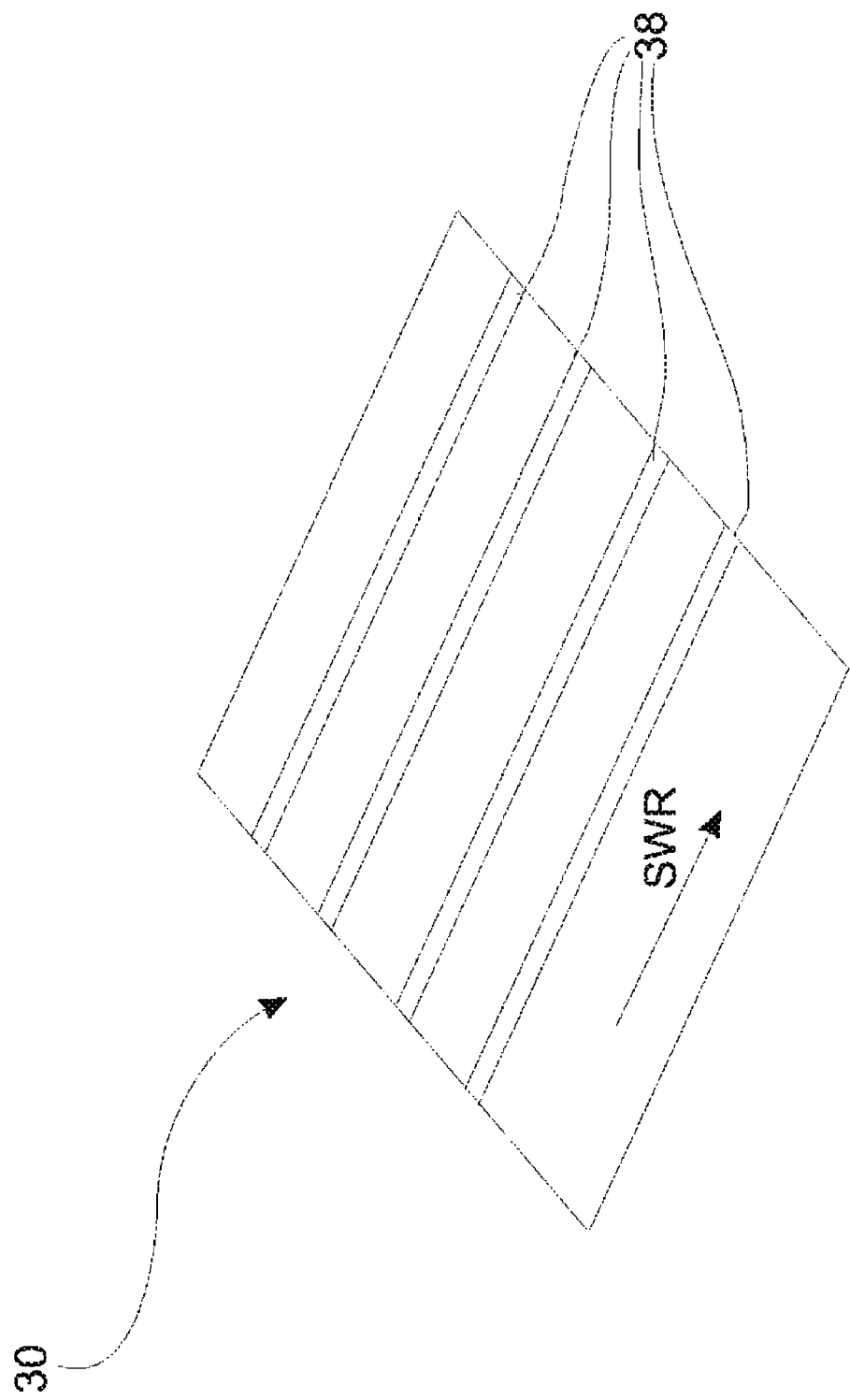
FIG. 4 is an isometric view of an embodiment of a skin section according to embodiments of the invention.

In order to switch the skin section 30 from its folded-in state 32 to its folded-out state 34, which can be advantageous, for example, when a gap is present between the aerodynamic body 10 and a main wing 110 of a wing 100, compressed air is injected into the cavity 62 between the skin section 30 and main body structure 20. It must here be noted that this cavity 62 is already present with the skin section 30 in the folded-in dimensional state 32, but with an extremely low volume. The more compressed air is introduced into the cavity 62, the higher the internal pressure therein. As soon as the internal pressure and the force it exerts on the skin section 30 become high enough, meaning exceed the material stress of the skin section in the folded-in state 32, the skin section 30 begins to deform. This deformation moves the skin section 30 away from the main body structure 20, until it runs through an area depicted, for example, as an intermediate state with reference number 36. As the skin section 30 moves, the internal pressure in the cavity 62 remains essentially constant, while additional compressed air continues to be supplied to refresh the corresponding air volume level for keeping the internal pressure constant. In each possible intermediate state, there hence exists equilibrium between the material stress in the skin section 30 on the one hand, which wants to push the latter back to the folded-in dimensional state 32, and the deformation force applied by the internal pressure for deforming the skin section 30 on the other. This process ends as soon as the skin section 30 has reached the folded-out dimensional state 34. This folded-out dimensional state 34 is here defined by the design of the skin section 30, which would only be able to undergo further deformation plastically, or against extremely high stresses in the material. For example, this can be accomplished with reinforcement elements (not shown), which can be achieved in both the spanwise direction of the aerodynamic body 10, and in directions transverse to the spanwise direction of the aerodynamic body 10. FIG. 4 presents an example of such a reinforced skin section 30.

Figure 3:
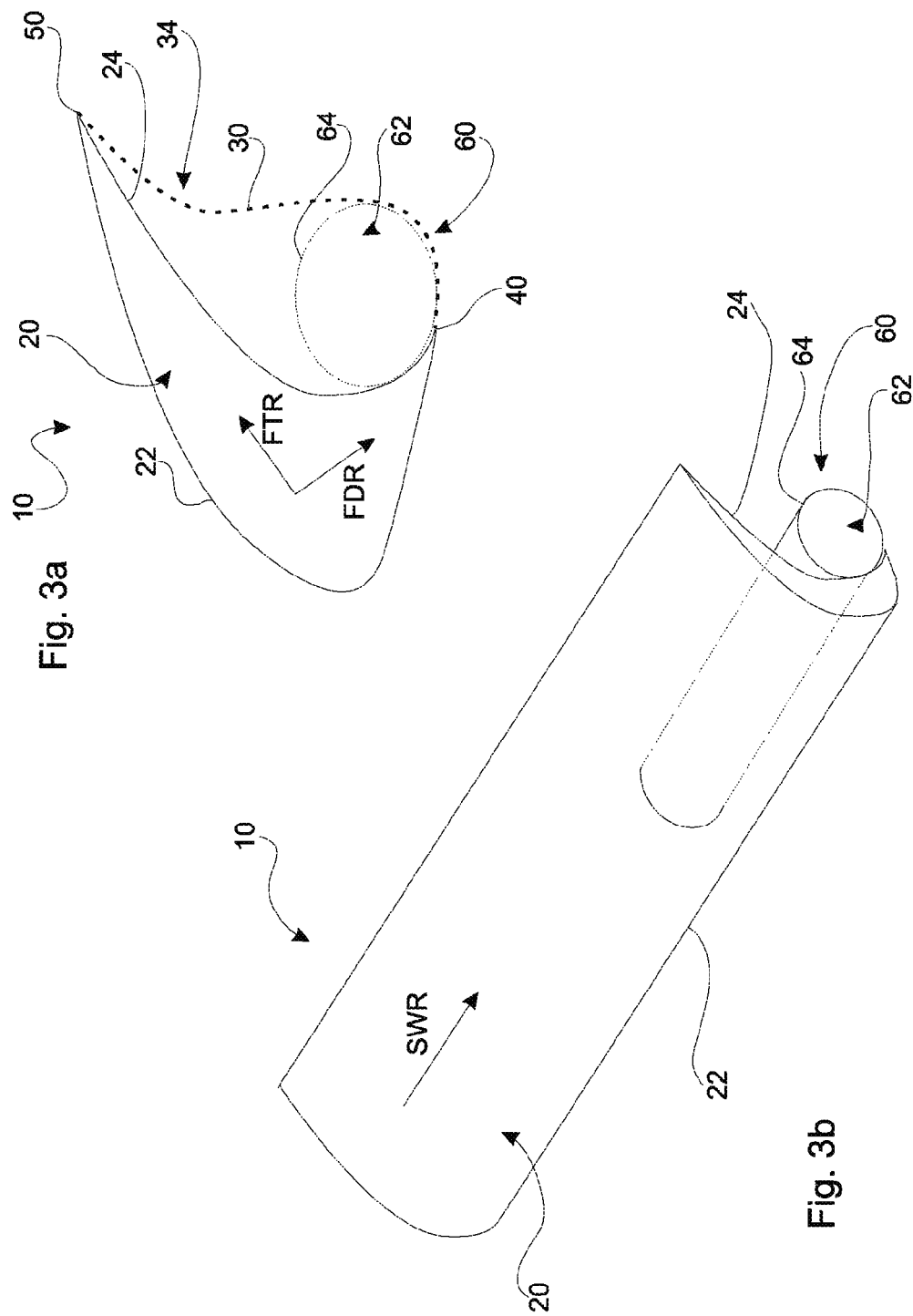

FIGS. 3a and 3b show another embodiment of the present invention, wherein a bubble structure 64 is used to help the skin section 30 move into its folded-out state 34. This bubble structure 64 is part of a adjustment device 60, which exhibits a port (not shown) for supplying the cavity 62 inside the bubble structure 64 with compressed air. The aerodynamic body 10 along with the skin section 30 and main body structure 20 on FIG. 3a are here identical to the embodiment depicted on FIGS. 1 and 2. The folding out process is essentially also the same as described for FIG. 2. However, the entire volume between the skin section 30 and main body structure 20 does not have to be filled with compressed air. Rather, it is enough for the compressed air to be introduced into the cavity 62 of the bubble structure 64 by way of the port, which is not depicted on FIG. 3a. In other words, the bubble structure 64 is inflated with the compressed air until it exhibits an essentially elliptical shape in cross section, as shown on FIG. 3a. In this state, the bubble structure 64 in an inflated state presses at least partial areas of the skin section 30 away from the main body structure 20, so that the shape of the folded-out dimensional state defined for the skin section 30 can come about.

In this case, a fixed clamp against which the skin section 30 must deform is provided in the second connection device 50, i.e., at the rear end of the skin section 30. Structural stress is hence introduced into the material of the skin section 30 in this area, which exerts restoring forces on the skin section 30. As soon as air is now let out of the bubble structure 64, these restoring forces in the structure of the skin section 30 act to move the skin section 30 back toward the main body structure 20. This return motion ends when the skin section 30 comes to abut the rear side 24 of the main body structure 20, as depicted on FIG. 1a. In other words, the bubble structure 64 in this embodiment only serves to support the shaping of the folded-out dimensional state 34 of the skin section 30. The skin section 30 is folded in exclusively by letting air out of the bubble structure 64, as a result of which the skin section 30 slowly moves back into its folded-in dimensional state.

As evident from FIG. 3b, a adjustment device 60 in the form of a bubble structure 64 does not have to extend over the entire spanwise direction SWR of an aerodynamic body 10. Rather, as depicted on FIG. 3b, it is also possible for a single bubble structure 64 to extend over a portion of the spanwise direction of the aerodynamic body 10, for example 30%, 40% or 50%. It is also possible to arrange additional bubble structures 64 not shown on FIG. 3b inside the aerodynamic body 10, either one after the other in the spanwise direction SWR or one atop the other in the wing thickness direction FDR. This gives rise to flat pressure regions or even individual pressure points, which can help move the skin section 30 into the folded-out dimensional state 34, as described above.

FIG. 4 presents an isometric depiction of a semi-finished product during the fabrication of the aerodynamic body 10 according to embodiments of the invention. This case involves a skin section 30 still prior to being connected by means of the two connection devices 40 and 50. This embodiment provides lamellar reinforcement elements 38, which are applied to the skin section 30 in the form of thin strips in the spanwise direction. The reinforcement elements 30 can here be arranged not just on the top of the skin section 30, but also within its structure. Arranging the reinforcement elements 38 in essentially the spanwise direction SWR of the skin section 30 reinforces the skin section 30 transversely to this direction. In other words, while the curvature depicted on FIGS. 1 to 3 can form without any problem, a curvature that would bend the lines in the spanwise direction SWR could only be achieved at a high outlay against the lamellar structure of the reinforcement elements 38. In other words, the reinforcement is direction-specific.

Figure 5:
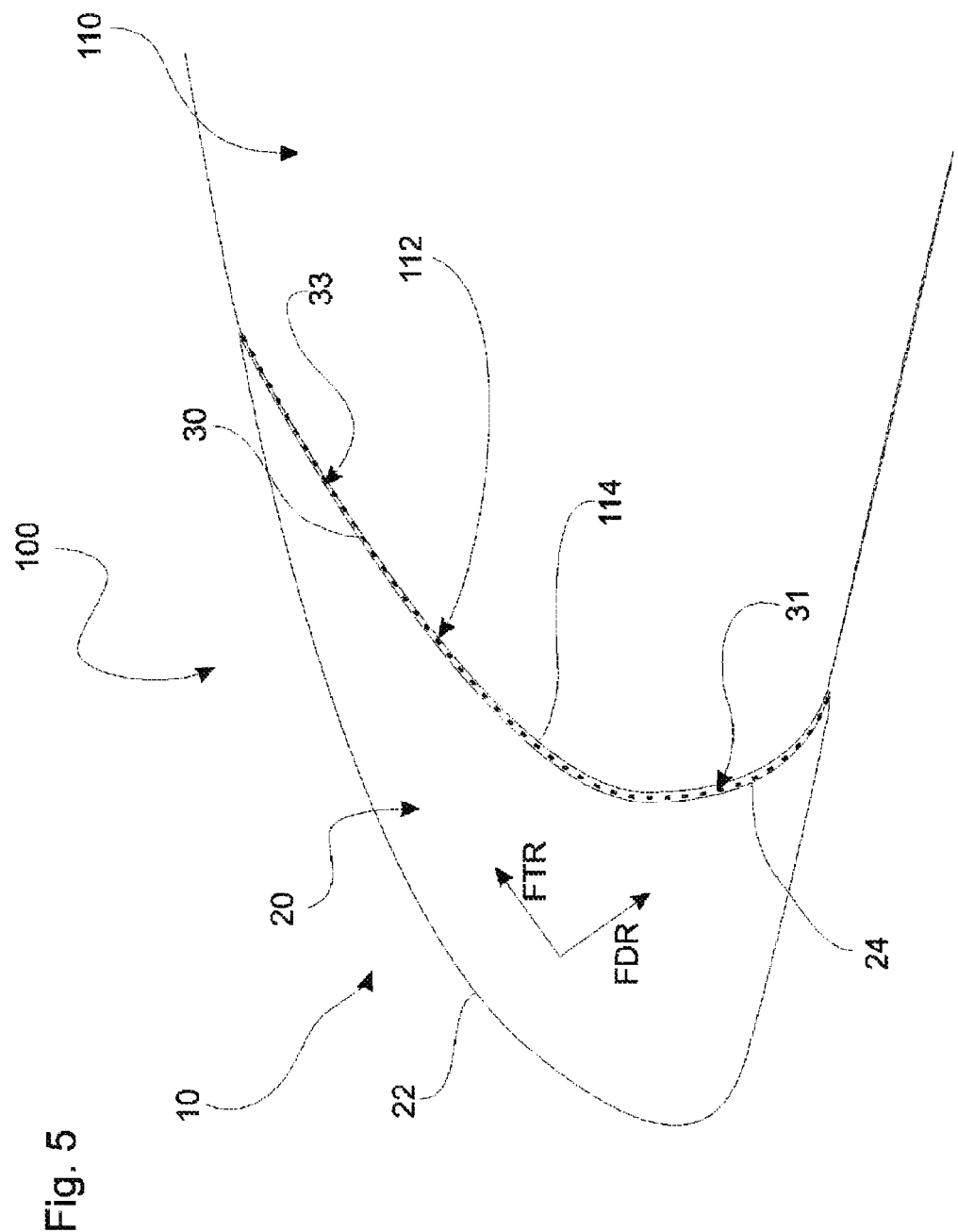
FIG. 5 is an embodiment of a wing according to various embodiments of the invention.

FIG. 5 shows a cross section of a wing 100 according to various embodiments of the invention in a segment depicting the main wing 110 and aerodynamic body 10 in the form of a leading edge flap. It readily illustrates the correlation between an aerodynamic body 10, which is here designed as a leading edge flap, and the main wing 110 of the wing 100. FIG. 5 here shows the retracted state of the aerodynamic body 10, meaning without an effective aerodynamic gap between the aerodynamic body 10 and main wing 110. As depicted here in particular, the rear side 24 of the main body structure 20 of the aerodynamic body 10 exhibits a concave curvature, while the leading edge 112 of the main wing 110 has a convex curvature 114 that complements the former. Also shown on FIG. 5 is the skin section 30 lying in between, which exhibits an identical curvature, meaning concave in relation to the main body structure 20 of the aerodynamic body 10 or convex in relation to the leading edge 112 of the main wing 110. The skin section 30 is here in the situation depicted on FIG. 5, in the folded-in dimensional state visible on FIG. 1a.

If the aerodynamic body 10 is now deployed during takeoff or landing, i.e., moves toward the left and away from the leading edge 112 of the main wing 110 on FIG. 5, a gap forms between the aerodynamic body 10 and the main wing 110. Air can flow through this gap, thereby improving the overall aerodynamic situation during the corresponding flight phase. After or already during deployment, the process of switching between the folded-in dimensional state 32 and folded-out dimensional state 34 of the skin section 30 gets underway. In the folded-out state 34, the gap between the aerodynamic body 10 and main wing 110 is hence at least partially diminished, since the skin section 30 is located in a position of the kind depicted on FIG. 1b, for example.

Figure 10:
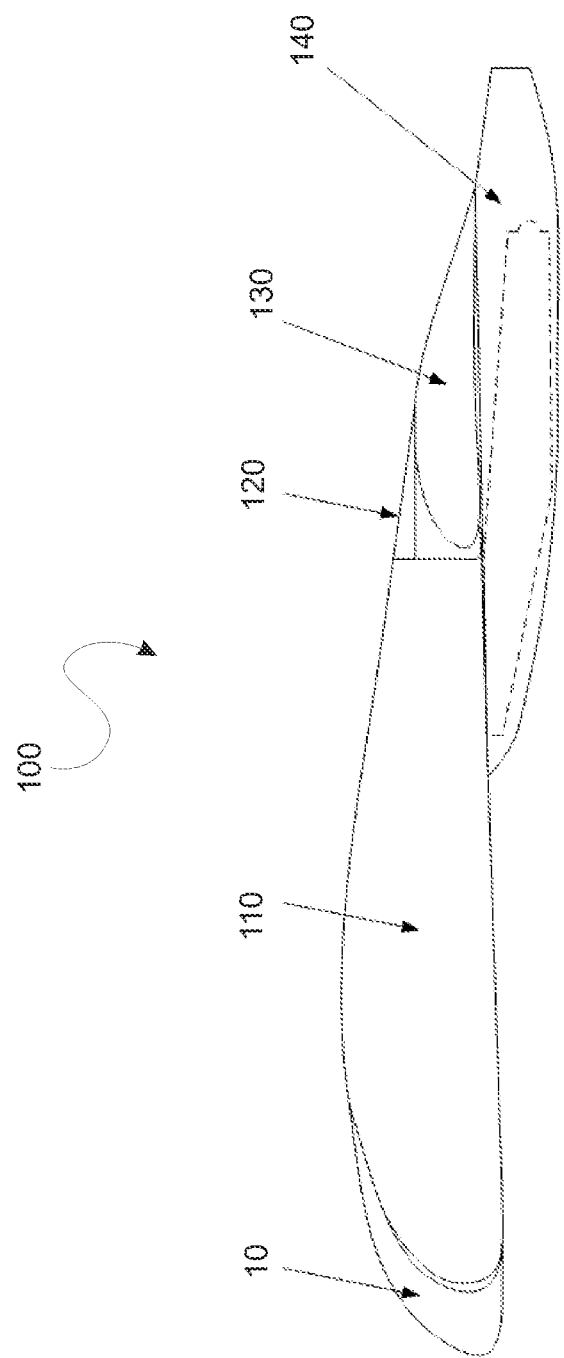
FIG. 10 is a cross section of a wing with an aerodynamic body according to embodiments of the invention.

To illustrate a potential application for an aerodynamic body 10 according to embodiments of the invention, FIG. 10 shows the entire wing 100. In the cross sectional view on FIG. 10, the latter exhibits a main wing 110, the front of which viewed in the wing chord direction FTR bears a leading edge flap in the form of an aerodynamic body 10. Regulating flaps in the form of a spoiler 120 and landing flap 130 are sequentially arranged on the opposing side of the wing 100 viewed in the wing chord direction FTR. The adjustment kinematics needed for adjusting the landing flap 130 are here arranged inside a cladding 140, which aerodynamically shields these kinematics from the flow around the wing 100. The depiction on FIG. 5 can be a section from the view shown on FIG. 10. However, it is also possible for the spoiler 120 or even the landing flap 130 to be alternatively or additionally configured as an aerodynamic body 10 according to embodiments of the invention.

Figure 6:
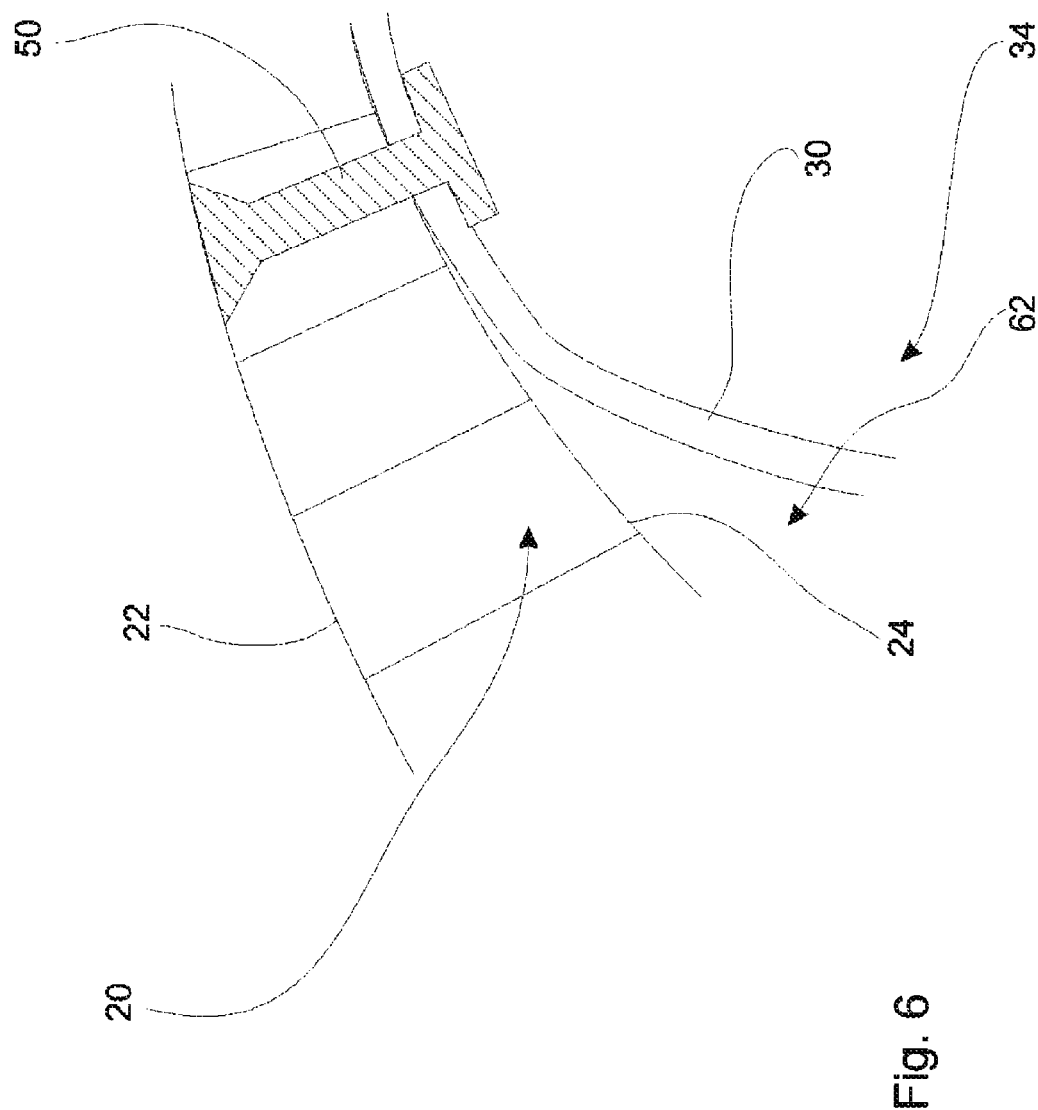
FIG. 6 is a detailed cross section of an embodiment according to the invention depicting the hinging in the rear area of the skin section.

FIG. 6 presents a detailed cross sectional view of a fixed connection, here between the second connection device 50 of the skin section 30 and the rear side 24 of the main body structure 20. In the embodiment according to FIG. 6, this second connection device 50 is designed as a rivet joint. Also readily visible in this diagrammatic view is the honeycomb structure inside the main body structure 20, which is used for purposes of reinforcement, in particular with respect to the dimensional stability of the front side 22 and rear side 24 of the main body structure. The skin section 30 on FIG. 6 is in the folded-out dimensional state 34. This can be discerned from the fact that it distances itself slowly from the rear side 24 of the main body structure, moving away from the second connection device 50. In this area, the skin section 30 is still concavely curved just like the rear side 24 in this area, but moves toward an inflection point, starting at which the section begins with a convex curvature in the folded-out dimensional state 34 of the skin section 30. The detailed section shown on FIG. 6 relates to a situation of the kind that may be gleaned from FIG. 1b, for example.

Also readily visible from FIG. 6 is the relatively strong deformation between the deformed area of the skin section 30 and the rigidly clamped area of the skin section 30 and the connection device 50. The latter can exhibit a slight kink, as depicted on FIG. 6, but also exhibit a continuous curvature change. This gives rise to structural stresses in the material of the skin section 30, which enable a restoration of the skin section 30 in the direction of the folded-in dimensional state 32, or exert a force in support of this restoration.

Figure 7:
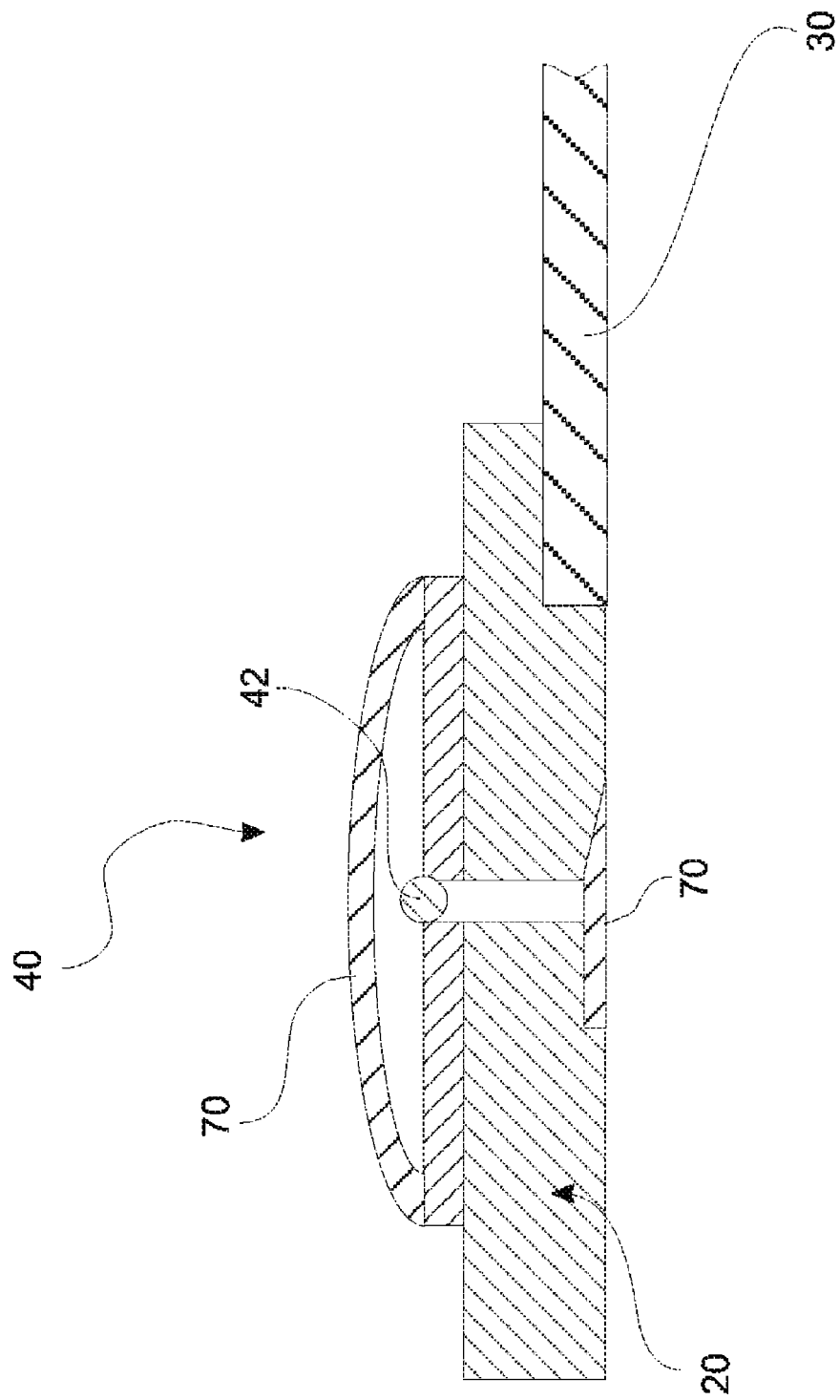
FIG. 7 is an embodiment of an articulated connection device.

FIG. 7 presents a cross section depicting an embodiment of a connection device, here the first connection device 40 in the front area 31 of the skin section 30, which enables an articulated joint. The articulated joint according to FIG. 7 is here a connection device 40 with a rotational angle of up to 180°. It exhibits two assemblies, wherein one assembly is integrally designed with the main body structure 20, while another assembly on the right of FIG. 7 establishes the contact with skin section 30. The two assemblies are connected with each other by way of a piano hinge, which exhibits an articulated axle 42. This articulated axle 42 can be used to rotate the two assemblies relative to each other, and hence also automatically rotate the connecting section 30 relative to the main body structure 20. FIG. 7 presents the situation in the folded-out dimensional state 34.

To ensure that the interior space between the skin section 30 and main body structure 20 is not contaminated, and furthermore that no pressure can be exchanged with this area either, a double seal is established on FIG. 7. The latter is achieved on the one hand by a sealing material 70, which is placed over the hinge of the connection device 40. This seals the rotating parts, as it were shifting them to the outer region. Also provided is another seal 70, which is provided on the outside of the two assemblies of the connection device 40. The latter exhibits a distinctly stronger structure, since it can additionally serve as a stop for the right assembly of the first connection device 40. As a result, the lower sealing device 70 also ensures that the right assembly of the connection device 40 cannot be moved by more than an angle of 180°, thereby defining the end position for the connection device 40 with the skin section 30 in the folded-out dimensional state 34.

FIGS. 8 and 9 show an alternative embodiment of the connection device 40. The latter differs in terms of how the hinge function is configured from the embodiment according to FIG. 7. The first connection device 40 is here designed as a flexible strap, for example of the kind also shown isometrically on FIG. 9. This flexible strap indirectly joins the main body structure 20 with the skin section 30 by means of adhesive bonds with the respective assemblies of the first connection device 40, meaning by way of an adhesive bond with the right assembly and an adhesive bond with the left assembly. This flexible element is here configured in such a way that it can fold, i.e., also enables a rotational angle of up to 180°, as is also possible in the embodiment according to FIG. 7.

Also provided in the embodiments according to FIGS. 8 and 9 are adjustment devices 60, which are secured directly to the connection device 40. The adjustment device 60 is here provided as a respective air channel, with cavities 62 extending transverse to the gap between the two assemblies of the connection device 40. If compressed air is now injected into the cavities 62 of the adjustment device 60 through a port (not shown), the latter expand and generate a force that acts on the flexible element of the connection device 40, which pushes the latter into a position as shown on FIGS. 8 and 9. In other words, filling the cavities 62 with compressed air helps move the hinge into the position according to FIGS. 8 and 9, and hence move the skin section 30 into the folded-out state 34.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An aerodynamic body comprising an extension in the spanwise direction, wing chord direction, and wing thickness direction for coupling to a wing of an aircraft, the aerodynamic body comprising:
 a main body structure with a front side, which has a dimensionally stable convex curvature, and a rear side, which has a dimensionally stable concave curvature, and a skin section for influencing the flow at the rear side of the main body structure, which is connected by a first connection device and a second connection device with the main body structure, and configured in such a way as to be at least partially flexible as well as reversibly molded between a folded-in dimensional state with a first curvature and a folded-out dimensional state with a second curvature, and that at least sections of the first curvature are concave, and at least sections of the second curvature are convex, in relation to the main body structure, wherein the skin section is movable between the folded-in dimensional state and the folded-out dimensional state in reaction to one or more changes in air pressure of a cavity disposed between the main body structure and the skin section.

2. The aerodynamic body according to claim 1, wherein at least one of the two connection devices exhibits an articulated axle along the spanwise direction, with which the skin section is pivoted to the main body structure.

3. The aerodynamic body according to claim 1, further comprising an adjustment device provided in the cavity, the adjustment device being configured to further assist in folding the skin section out and/or in.

4. The aerodynamic body according to claim 3, wherein the adjustment device comprises at least one bubble structure disposed within the cavity, which is supported against the main body structure and arranged in such a way as to support the skin section as it folds out and/or in during inflation with compressed air and/or evacuation.

5. The aerodynamic body according to claim 1, wherein the skin section is designed in such a way as to be free of stress in an intermediate adjustment state between the folded in dimensional state and the folded-out dimensional state.

6. The aerodynamic body according to claim 1, wherein the skin section consists of at least one of Titanium, Aluminum, High-grade steel, Fiber composite with epoxy matrix, Fiber composite with thermoplastic matrix, and Fiber composite with silicone matrix.

7. The aerodynamic body according to claim 1, wherein one of the connection devices is designed as a rotary joint, which allows the skin section to execute a folding motion at the attachment site by at least 120° around a rotational axis of the rotary joint.

8. The aerodynamic body according to claim 1, wherein reinforcing elements are provided in or on the skin section to partially brace the skin section.

9. The aerodynamic body according to claim 1, wherein the skin section exhibits sections of varying thickness over its progression transverse to the spanwise direction.

10. The aerodynamic body according to claim 1, wherein the first connection device and/or the second connection device is equipped with sealing materials, which seal the volume between the skin section and main body structure to the outside.

11. The aerodynamic body according to claim 1, wherein a temporary airflow leak can be achieved at least in segments of the skin section.

12. The aerodynamic body according to claim 1, wherein at least one of the connection devices is configured as a fixed connection, designed in such a way that the skin section and the main body structure run parallel to each other at the connection site.

13. A wing comprising a main wing and at least one aerodynamic body exhibiting the features of claim 1, which forms a slat or a front wing flap, and can be moved relative to the main wing of the wing in at least a flight depth direction, so that a gap can be generated between the slat or front wing and the main wing, and further that the first curvature in the folded-in state of the skin section runs along the curvature of a leading edge of the main wing corresponding thereto.

14. An aircraft comprising at least two wings according to claim 13.

* * * * *